June 21, 1949. R. C. DEHMEL 2,474,097
CHART HOLDER
Filed May 21, 1946
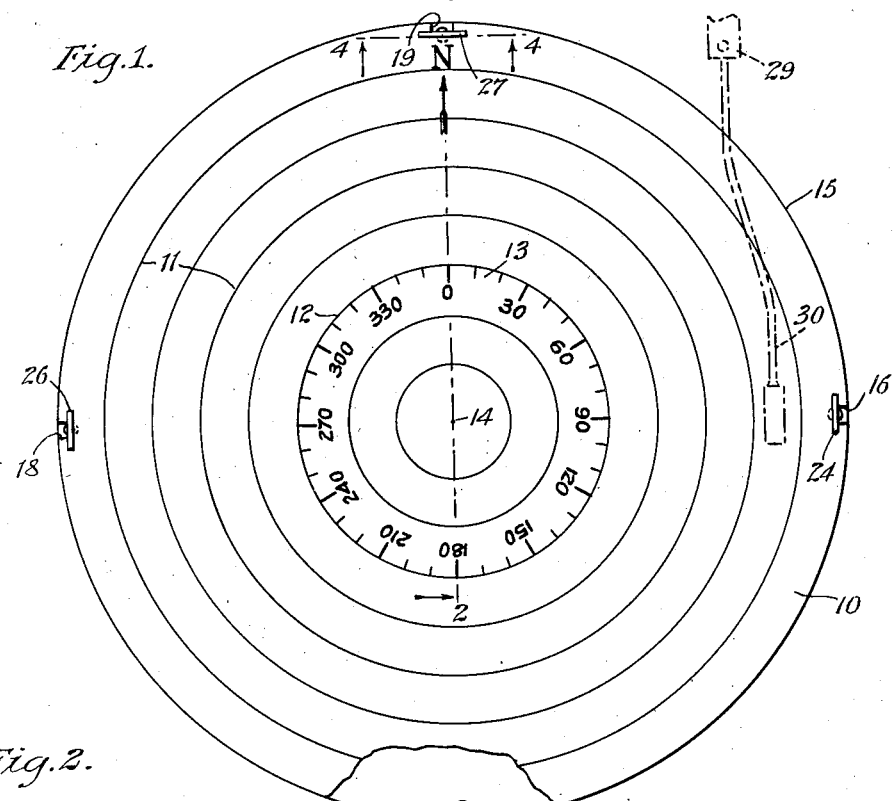
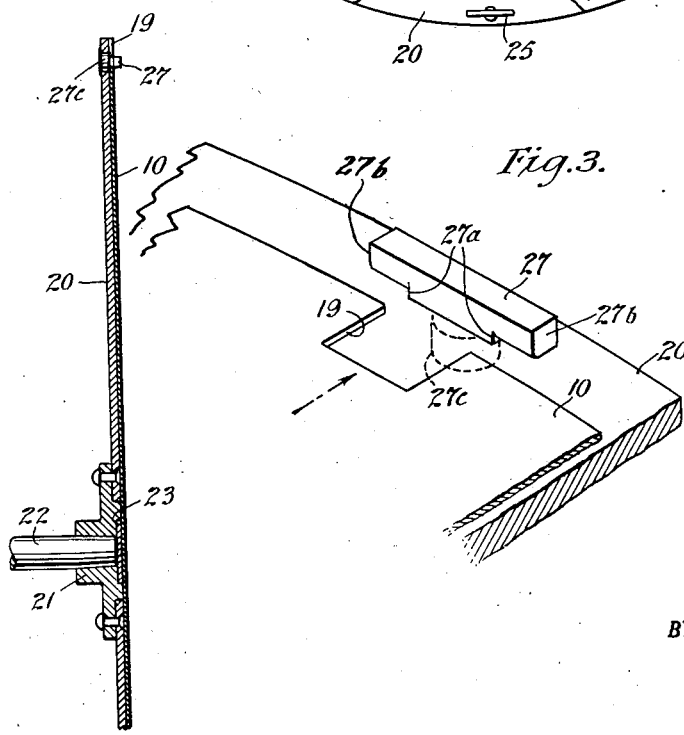
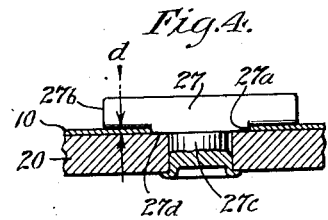
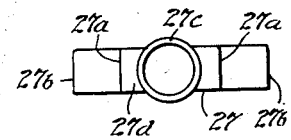
INVENTOR.
Richard C. Dehmel
BY
ATTORNEY Patented June 21, 1949

2,474,097

UNITED STATES PATENT OFFICE 2,474,097

CHART HOLDER

Richard Carl Dehmel, Summit, N. J.

Application May 21, 1946, Serial No. 671,278

1 Claim. (Cl. 346—137)

This invention relates to chart holders and particularly to holders for circular charts that are mounted for rotary movement about a fixed center with respect to a recording stylus or pen element.

Recording devices using charts of the above character are well known in the art and have a wide range of applications. For example there is disclosed in my copending application S. N. 607,333, filed July 27, 1945, for "Aircraft training apparatus," apparatus for recording the simulated flight path of a grounded aircraft trainer wherein the chart is rotated in accordance with change in azimuth of the flight position with reference to a simulated station represented by the center of the chart, and the pen element is moved transversely of the chart surface in accordance with change in radial distance of the flight position from said station. In recording apparatus of this character it is difficult to position and hold precisely in the proper position the paper or semi-flexible cardboard charts so as to prevent waving or sagging and consequent slight shifting of the chart surface, particularly when the plane of the chart is vertical. A prime consideration in the operation of recording devices is that the chart holder and chart be simply designed so that a chart can be quickly removed, replaced and orientated accurately all without difficulty or confusion. This necessitates not only a minimum of clamping or holding devices for the chart but also that these devices be simply constructed for quick and easy application.

A principal object of this invention therefore is to provide an improved chart holder for paper charts and the like that is extremely simple in design and construction for facilitating chart positioning and replacement, and that is effective for holding the chart in proper position, even when it is vertically positioned so that the chart surface is always smooth and in its precise orientated position for recording purposes.

The invention will be more fully set forth in the following description referring to the accompanying drawing, and the features of novelty will be pointed out with particularity in the claims annexed to and forming a part of this specification.

Referring to the drawing

Fig. 1 is a plan view of a disc-type chart holder embodying the present invention and a specific form of recording chart which may be used therewith;

Fig. 2 is a sectional view in elevation of a part of the rotary chart holder of Fig. 1;

Fig. 3 is an enlarged view in perspective of a positioning-holding element of the chart holder and a notched portion of the chart about to be moved into proper position;

Fig. 4 is an enlarged detail view showing the construction of the aforesaid element taken along the line 4—4 of Fig. 1, and Fig. 5 is a plan view from beneath showing the aforesaid element before assembly.

In the drawings and referring first to Fig. 1, there is disclosed a chart 10 of disc-like circular form composed of a semi-flexible material such as cardboard or paper which is adapted for use with the present invention. The chart may have printed thereon certain data which forms no part of the present disclosure, and has also printed thereon a series of concentric circles 11 and 12 spaced equally apart, one of the circles 12 having printed thereon a scale 13, in the instant case graduated in degrees of azimuth from 0 to 360. The recording or writing surface which contains the circles and graduations is continuous from edge to edge and thus provides a smooth unbroken surface including the center 14. The periphery or outlining marginal edge 15 of the chart is provided with a plurality of narrow slots, notches or recesses, in the instant case shown to be positioned 90° apart. These slots or recesses as 16, 18, and a third recess at the bottom of the chart (not shown) have the same dimension measured circumferentially, but the fourth or orienting slot 19 is materially wider in its circumferential dimension than the other three. This recess 19 is prominently designated as the "north" recess by a large "N" and is located in the radius which passes through the zero graduation on the scale 13.

Referring also to Fig. 2 the chart 10 is mounted flatwise on a support or mounting plate 20 adapted to be rotated about an axis which passes through its center 14 by means of mechanism forming a part of the complete trainer and not otherwise necessary to the present disclosure. The mounting for the chart holder includes a hub 21 secured to the end of a driving shaft 22 for carrying the plate 20. In the particular form of device illustrated a filler disc 23 at the end of shaft 22 forms the center of the mounting plate or holder and cooperates therewith to provide a smooth surface against which the chart lies so that the chart is backed by a continuous support for resisting the pressure that may be imposed thereon by the tracing pen hereinafter described.

The chart 10 is orientated and positioned on its holder so that it lies flat against the same by means of a plurality of spaced T-shaped pins 24, 25, 26 and 27 that are suitably secured to the plate 20 about its periphery so as to be aligned with the notches 16, bottom notch, 18 and 19 respectively of the chart.

Referring specifically to Figs. 3, 4 and 5, the T pin 27 for example is provided with a base or leg portion 27a that corresponds in width to the width of notch 19 in which the leg normally fits and that is welded, riveted or otherwise suitably secured to the plate 20, and a lateral or flange portion 27b that extends generally in a tangential direction with respect to the adjacent periphery of the chart so as to overhang the chart material at opposite sides of the notch 19 when the chart is in position. This flange portion 27b of the T is so spaced by the leg 27a from the plate 20 that the clearance equals very closely the thickness of the chart as best shown by Figs. 3 and 4. Accordingly the chart is held by the T flange in easy frictional engagement with the plate 20 so as to give positive support to the chart to hold it in fixed position while at the same time allowing the chart to slide easily beneath the pin. The remaining T pins are similarly constructed, except that the leg portions thereof are comparatively narrow to correspond with the notches 16, bottom notch, and 18 in which they fit, the T flanges in each instance overhanging the chart material so as to engage lightly the upper surface of the chart in the manner of pin 27.

Figs. 4 and 5 illustrate the detail construction of the pin 27 for example wherein the leg portion 27a includes an extension 27c adapted to function as a rivet for holding the T pin to the plate 20. As illustrated in Figs. 2 and 4, the rivet portion 27c extends through an aperture in the plate so that the pin can be riveted in position. The base of the leg 27a forms a shoulder 27d that seats flush on the surface of the plate so that the clearance $d$ is not affected by variation in the length of the rivet 27c during the riveting operation. Fig. 5 shows the rivet portion 27c before riveting to the plate 20. The other T pins are preferably of similar construction and arrangement so as to be mounted on the plate 20 in the same manner as pin 27.

I have found that this arrangement for positioning and holding the chart is, notwithstanding its extreme simplicity, very efficient for holding the chart smooth and flat against its holder even when the plane of the chart is vertical. Once in position the chart is automatically adjusted to the proper scale indication. This might not be the case if the chart were held solely by spring clips for example, since in such a case a wavy or misaligned portion of the chart would remain in its improperly oriented position. The trace made by the recording pen would therefore include a scale error which might be serious where precision is required, as in the case of flight recording above referred to.

There is also indicated in Fig. 1 in fragmentary and phantom outline a recording device 29 disposed in offset relation to the chart and its mounting plate, and which insofar as this disclosure is concerned may be assumed to be both rocked about its pivot and advanced along the chart surface by mechanism forming part of the trainer device and controlled by its operator. The recording device includes a long depending arm 30 which overlaps at least the upper half of the diameter of the chart, and at its outer or lower end carries a tracing pen (not shown) of conventional construction and designed to form a line on the chart as the recording device traverses the chart surface.

In operation, assuming that an old or used chart is already in position on the mounting, it is simply necessary to lift the arm 30 away from the chart, slide an edge of the chart out from under a pair of adjacent T pins and remove the old chart. A new chart can be readily substituted therefor since the operator need observe only that the notch oppposite the large "N" recess is aligned with and slid under the large T pin 27. The chart is then bent slightly and shifted if necessary so as to bring the other three recesses 16 to 18 in alignment with and under their respective locating T pins thereby accurately orientating and positioning the chart after which the tracing pen is replaced. Under normal operating conditions the chart remains in this position while the chart is being rotated and the pen moved across its surface for the entire recording operation.

It should be understood that this invention is not limited to specific details of construction and arrangement thereof herein illustrated, and that changes and modifications may occur to one skilled in the art.

What is claimed is:

In recording apparatus, a recorder chart holder for a replaceable semi-flexible chart, said chart having a continuous central surface and having positioning notches at the periphery thereof, comprising a plate-like support having a flat bearing surface, and a plurality of pin-like elements mounted in fixed spaced relation on said surface around the periphery of said support constituting the sole means for orientating, driving and snugly holding said chart in position, said elements each comprising a T-shaped structure arranged so that the leg of the T is secured in upright relation to said support and corresponds in cross-sectional shape to the corresponding chart notch so as to fit snugly therein for orientating and driving said chart, and the flange of the T at its opposite ends overhangs the chart material so that the clearance between said flange and the support surface corresponds to the thickness of the chart material for holding said chart snugly against said support surface whereby the flange holds said chart so that it lies flat and smooth against said holder and is precluded from wrinkling under chart operating conditions.

RICHARD CARL DEHMEL.

REFERENCES CITED

The following references are of record in the file of this patent:

UNITED STATES PATENTS

| Number | Name | Date |
|---|---|---|
| 373,719 | Brewster | Nov. 22, 1887 |
| 670,527 | Beechey | Mar. 26, 1901 |
| 1,290,890 | Bristol | Jan. 14, 1919 |
| 1,720,148 | Rodanet | July 9, 1929 |
| 2,146,378 | MacDuff | Feb. 7, 1939 |